United States Patent
Oosugi

(10) Patent No.: US 7,333,025 B2
(45) Date of Patent: Feb. 19, 2008

(54) REMOTE CONTROL APPARATUS, ELECTRONIC APPARATUS, AND AVAILABLE-BUTTON INDICATING METHOD

(75) Inventor: Jun Oosugi, Tokyo-to (JP)

(73) Assignee: Pioneer Corporation, Tokyo-to (JP)

( * ) Notice: Subject to any disclaimer, the term of this patent is extended or adjusted under 35 U.S.C. 154(b) by 248 days.

(21) Appl. No.: 10/374,093

(22) Filed: Feb. 27, 2003

(65) Prior Publication Data

US 2003/0162494 A1    Aug. 28, 2003

(30) Foreign Application Priority Data

Feb. 28, 2002    (JP) .................. P2002-052781

(51) Int. Cl.
    *G08C 19/00* (2006.01)
(52) U.S. Cl. .............. 340/825.72; 340/426.1; 340/825.22; 455/92; 455/151.1; 455/352
(58) Field of Classification Search ........... 340/825.72, 340/426.1, 825.22, 170, 426.13, 815; 455/550.1, 455/92, 151.1, 352, 73
    See application file for complete search history.

(56) References Cited

U.S. PATENT DOCUMENTS

| | | | |
|---|---|---|---|
| 4,746,919 A | 5/1988 | Reitmeier | ............. 340/825.56 |
| 5,455,570 A * | 10/1995 | Cook et al. | ............. 340/825.22 |
| 5,506,563 A * | 4/1996 | Jonic | ............. 340/426.34 |
| 6,005,490 A * | 12/1999 | Higashihara | ............ 340/825.72 |
| 6,310,609 B1 * | 10/2001 | Morgenthaler | ............. 345/170 |
| 6,487,422 B1 * | 11/2002 | Lee | ............. 455/550.1 |
| 7,017,125 B1 * | 3/2006 | Matsumoto | ............. 715/864 |

FOREIGN PATENT DOCUMENTS

| | | |
|---|---|---|
| EP | 0 872 996 A | 10/1998 |
| EP | 1 030 517 A | 8/2000 |
| JP | 3-48986 | 5/1991 |
| JP | 4-299695 A | 10/1992 |
| JP | 09-046770 | 2/1997 |
| JP | 10-028297 | 1/1998 |
| JP | 2001-109710 | 4/2001 |

* cited by examiner

*Primary Examiner*—Nay Maung
*Assistant Examiner*—Dominic E. Rego
(74) *Attorney, Agent, or Firm*—Drinker Biddle & Reath LLP

(57) ABSTRACT

A remote control apparatus for remotely operating an electronic apparatus, is provided with: a reception device which receives a signal indicating available operation buttons transmitted from the electronic apparatus; and an indication device which explicitly indicates available operation buttons from among a plurality of operation buttons based on the received signal which indicates available operation buttons.

17 Claims, 15 Drawing Sheets

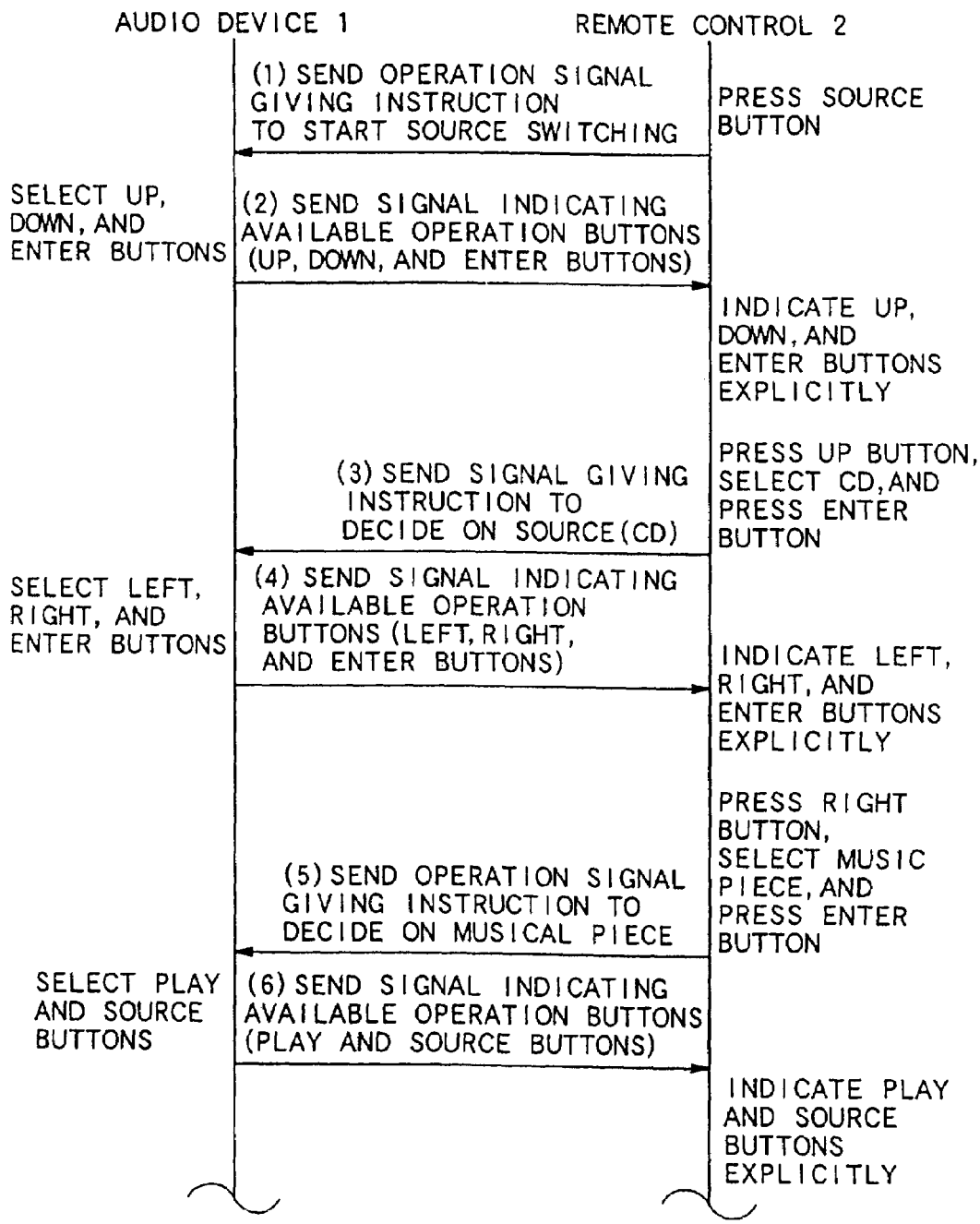

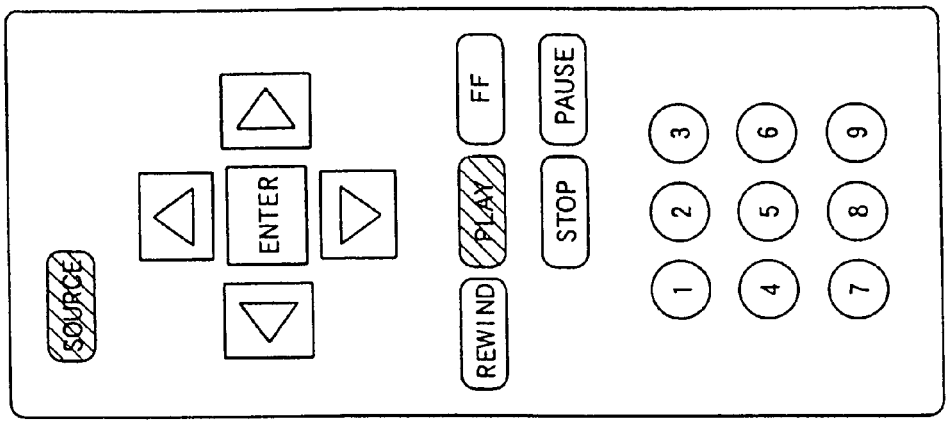
FIG. 7C
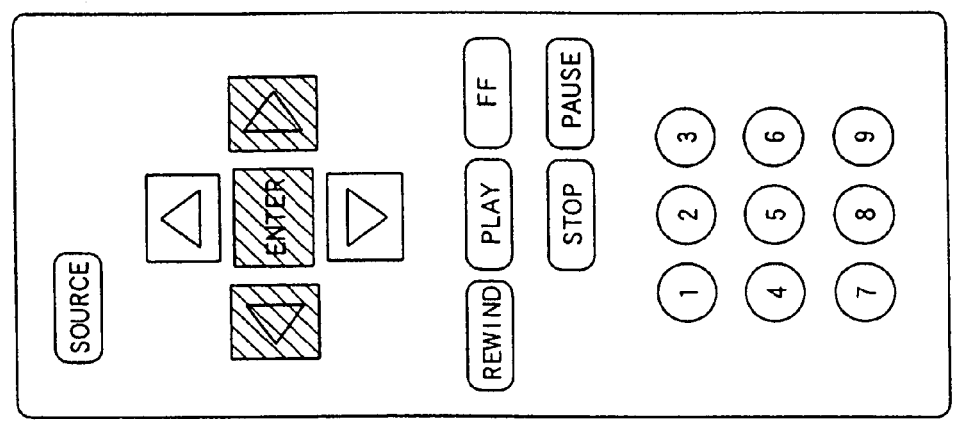
FIG. 7B
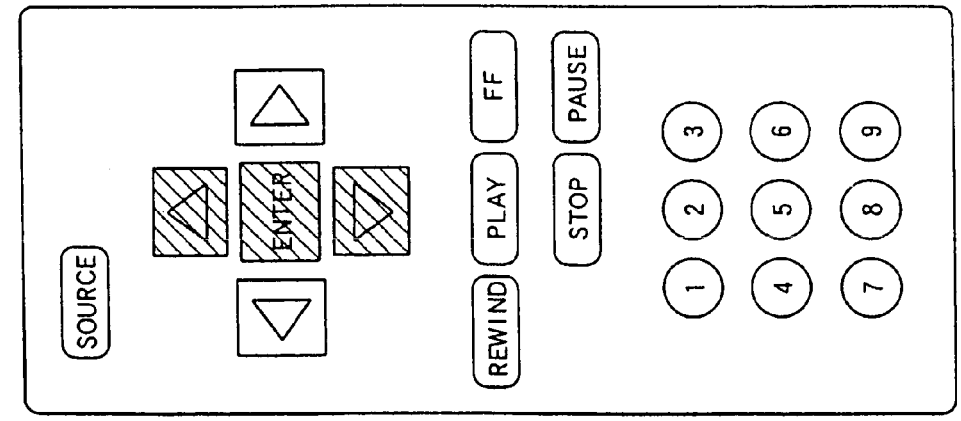
FIG. 7A

REMOTE CONTROL APPARATUS, ELECTRONIC APPARATUS, AND AVAILABLE-BUTTON INDICATING METHOD

BACKGROUND OF THE INVENTION

1. Field of the Invention

The present invention relates to a remote control apparatus, portable communications terminal, and operation panel for remotely operating a multifunctional electronic apparatus. More particularly, it relates to a remote control apparatus, etc. with enhanced operability.

2. Description of the Related Art

Recently, electronic apparatuses such as audio apparatuses, VTRs (Videotape Recorders), CD (Compact Disc) apparatuses, DVD (Digital Versatile Disc) apparatuses, and navigation apparatuses have become multifunctional. To accommodate the expanding functionality of such electric apparatuses, remote control apparatuses for remotely operating such apparatuses are configured such that the number of operation buttons is increased, that two or more operational functions are assigned to a single operation button, or that operations are controlled hierarchically according to operating status of an electronic apparatus.

However, such conventional measures makes it necessary for the user to operate a large number of operation buttons at many levels, resulting in low operability and an increased operator burden. Also, since available operation buttons differ each time, it is not easy for the user to determine what buttons are currently enabled. Besides, it is extremely difficult for those who are poor at electronic apparatuses, advanced in age, or weak-sighted to keep up with multifunctional products.

SUMMARY OF THE INVENTION

It is therefore an object of the present invention to provide a remote control apparatus, electronic apparatus, and available-button indicating method which can achieve simpler operability.

The above object of the present invention can be achieved by a remote control apparatus for remotely operating an electronic apparatus provided with: a reception device which receives a signal indicating available operation buttons transmitted from the electronic apparatus; and an indication device which explicitly indicates (specifies) available operation buttons from among a plurality of operation buttons based on the received signal which indicates available operation buttons.

According to the present invention, since available operation buttons are indicated (specified) from among a plurality of operation buttons, the user can understand quickly and precisely what buttons are available. Thus, it is possible to achieve simpler operability.

The above object of the present invention can be achieved by a remote control apparatus for remotely operating an electronic apparatus provided with: a plurality of operation buttons for remotely operating the electronic apparatus; a transmission device which transmits an operation signal to the electronic apparatus in accordance with any operation button pressed from among the operation buttons; a reception device which receives a signal indicating available operation buttons transmitted from the electronic apparatus after the operation signal is transmitted to the electronic apparatus; and an indication device which explicitly indicates available operation buttons from among said plurality of operation buttons based on the received signal which indicates the available operation buttons.

According to the present invention, since available operation buttons are indicated from among a plurality of operation buttons, the user can understand quickly and precisely what button to press next after pressing a first button. Thus, it is possible to achieve simpler operability.

In one aspect of the remote control apparatus of the present invention, each of the operation buttons has an illumination capability, and the indication device illuminates the available operation buttons.

According this aspect, since available operation buttons are illuminated, the user can visually understand available operation buttons.

In another aspect of the remote control apparatus of the present invention, each of the operation buttons has a vibration capability, and the indication device vibrates the available operation buttons.

According this aspect, since available operation buttons are vibrated, the user can understand available operation buttons through a tactile sense. Also, this can improve intuitive understanding (information can be conveyed quickly) and effectively supplement other sensory organs.

In further aspect of the remote control apparatus of the present invention, each of the operation buttons has an illumination capability and vibration capability, and the indication device both illuminates and vibrates the available operation buttons.

According this aspect, since available operation buttons are both illuminated and vibrated, the user can understand available operation buttons through both visual and tactile senses. Thus, the user can understand more quickly and precisely what buttons are available.

In further aspect of the remote control apparatus of the present invention, the indication device explicitly indicates the available operation buttons only if the reception device receives a signal which indicates the available operation buttons within a predetermined time after the operation button is pressed.

The remote control apparatus may be a portable communications terminal such as a portable telephone, PHS (Personal Handy-phone System), PDA (mobile terminal), or the like.

According this aspect, since available operation buttons are indicated from among a plurality of operation buttons on a portable communications terminal, the user can understand quickly and precisely what buttons are available. Thus, it is possible to achieve simpler operability.

The above object of the present invention can be achieved by an electronic apparatus provided with: a selection device which selects available operation buttons on a remote control apparatus equipped with a plurality of operation buttons for remotely operating the electronic apparatus; and a transmission device which transmits a signal which indicates the selected available operation buttons to the remote control apparatus.

According to the present invention, since available operation buttons are selected and a signal indicating them is transmitted to a remote control apparatus, the remote control apparatus can explicitly indicate the available operation buttons based on the signal.

The above object of the present invention can be achieved by an electronic apparatus provided with: a reception device which receives an operation signal transmitted from a remote control apparatus equipped with a plurality of operation buttons for remotely operating an electronic apparatus; a selection device which selects available operation buttons on the remote control apparatus based on the received operation signal; and a transmission device which transmits a signal which indicates the selected available operation buttons to the remote control apparatus.

According to the present invention, since subsequently available operation buttons are selected based on an operation signal from a remote control apparatus and a signal indicating them is transmitted to the remote control apparatus, the remote control apparatus can explicitly indicate the available operation buttons based on the signal.

The above object of the present invention can be achieved by an electronic apparatus equipped with an operation panel which contains a plurality of operation buttons provided with: a recognition device which recognizes any operation button pressed from among the operation buttons; a selection device which selects available operation buttons from among the plurality of operation buttons based on results of the recognition; and an indication device which explicitly indicates the selected available operation buttons.

According to the present invention, since available operation buttons are indicated from among a plurality of operation buttons, the user can understand quickly and precisely what button to press next after pressing a first button. Thus, it is possible to achieve simpler operability.

In one aspect of the electronic apparatus of the present invention, each of the operation buttons has an illumination capability; and the indication device illuminates the available operation buttons.

According this aspect, since available operation buttons are illuminated, the user can visually understand available operation buttons.

In another aspect of the electronic apparatus of the present invention, each of the operation buttons has a vibration capability, and the indication device vibrates the available operation buttons.

According this aspect, since available operation buttons are vibrated, the user can understand available operation buttons through a tactile sense. Also, this can improve intuitive understanding (information can be conveyed quickly) and effectively supplement other sensory organs.

In further aspect of the electronic apparatus of the present invention, each of the operation buttons has an illumination capability and vibration capability, and the indication device both illuminates and vibrates the available operation buttons.

According this aspect, since available operation buttons are both illuminated and vibrated, the user can understand available operation buttons through both visual and tactile senses. Thus, the user can understand more quickly and precisely what buttons are available.

In further aspect of the electronic apparatus of the present invention, the operation panel is removably mounted on the electronic apparatus.

The above object of the present invention can be achieved by an available-button indicating method for explicitly indicating, to the user, operation buttons available for use to remotely operate an electronic apparatus from among a plurality of operation buttons mounted on a remote control apparatus provided with: a step in which the electronic apparatus selects available operation buttons on the remote control apparatus; a step in which the electronic apparatus transmits a signal indicating the selected available operation buttons to the remote control apparatus; and a step in which the remote control apparatus indicates the available operation buttons from said plurality of operation buttons based on the signal indicating the available operation buttons and transmitted from the electronic apparatus.

According to the present invention, since available operation buttons are indicated from among a plurality of operation buttons, the user can understand quickly and precisely what buttons are available. Thus, it is possible to achieve simpler operability.

The above object of the present invention can be achieved by an available-button indicating method for explicitly indicating, to the user, operation buttons available for use to operate an electronic apparatus from among a plurality of operation buttons mounted on a remote control apparatus provided with: a step in which the remote control apparatus transmits an operation signal to the electronic apparatus in accordance with any operation button pressed from among said plurality of operation buttons on the remote control apparatus; a step in which the electronic apparatus selects available operation buttons on the remote control apparatus based on the operation signal transmitted from the remote control apparatus; a step in which the electronic apparatus transmits a signal indicating the selected available operation buttons to the remote control apparatus; and a step in which the remote control apparatus explicitly indicates the available operation buttons from among said plurality of operation buttons based on the signal indicating the available operation buttons and transmitted from the electronic apparatus.

According to the present invention, since available operation buttons are indicated from among a plurality of operation buttons, the user can understand quickly and precisely what button to press next after pressing a first button. Thus, it is possible to achieve simpler operability.

BRIEF DESCRIPTION OF THE DRAWINGS

FIG. 6 is a sequence showing a concrete example of signal exchange between the audio apparatus 1 and remote control 2;

FIGS. 7A to 7C are a diagram showing what operation buttons are illuminated on the remote control 2 in each operational state of the audio apparatus 1;

DETAILED DESCRIPTION OF THE PREFERRED EMBODIMENTS

Preferred embodiments of the present invention will be described below with reference to the accompanying drawings. Incidentally, the embodiments described below concern cases in which electronic apparatuses according to the present invention are applied to audio apparatuses. It is assumed that such an audio apparatus provides content or other information to the user by switching among a plurality of sources such as CD, MD (Mini Disc), and Tuner.

First Embodiment

A first embodiment concerns a case in which signals are exchanged between the audio apparatus described above and a remote control apparatus according to the present invention.

Figure 1:
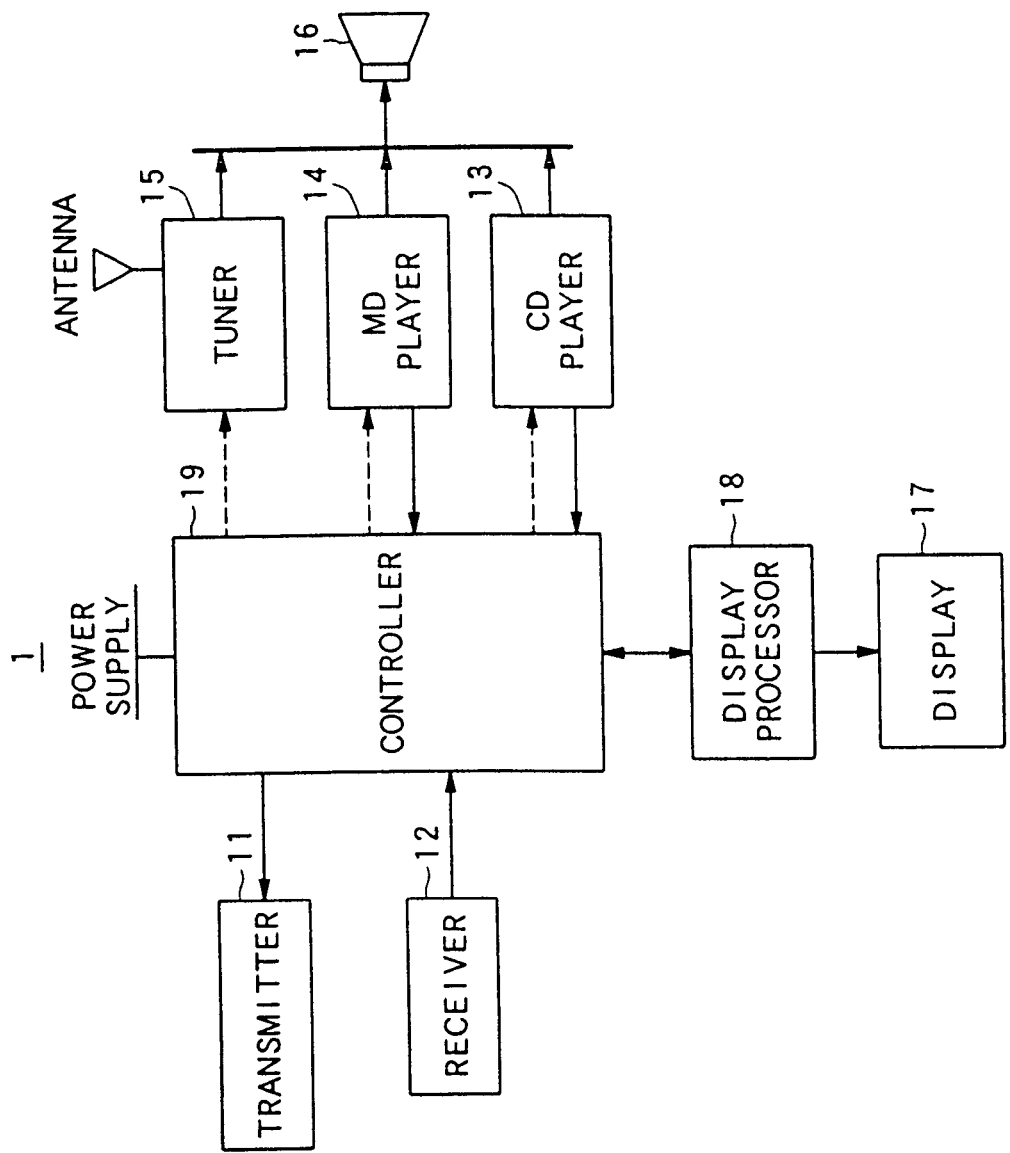
FIG. 1 is a diagram showing an exemplary schematic inner configuration of an audio apparatus according to a first embodiment.
Figure 2:
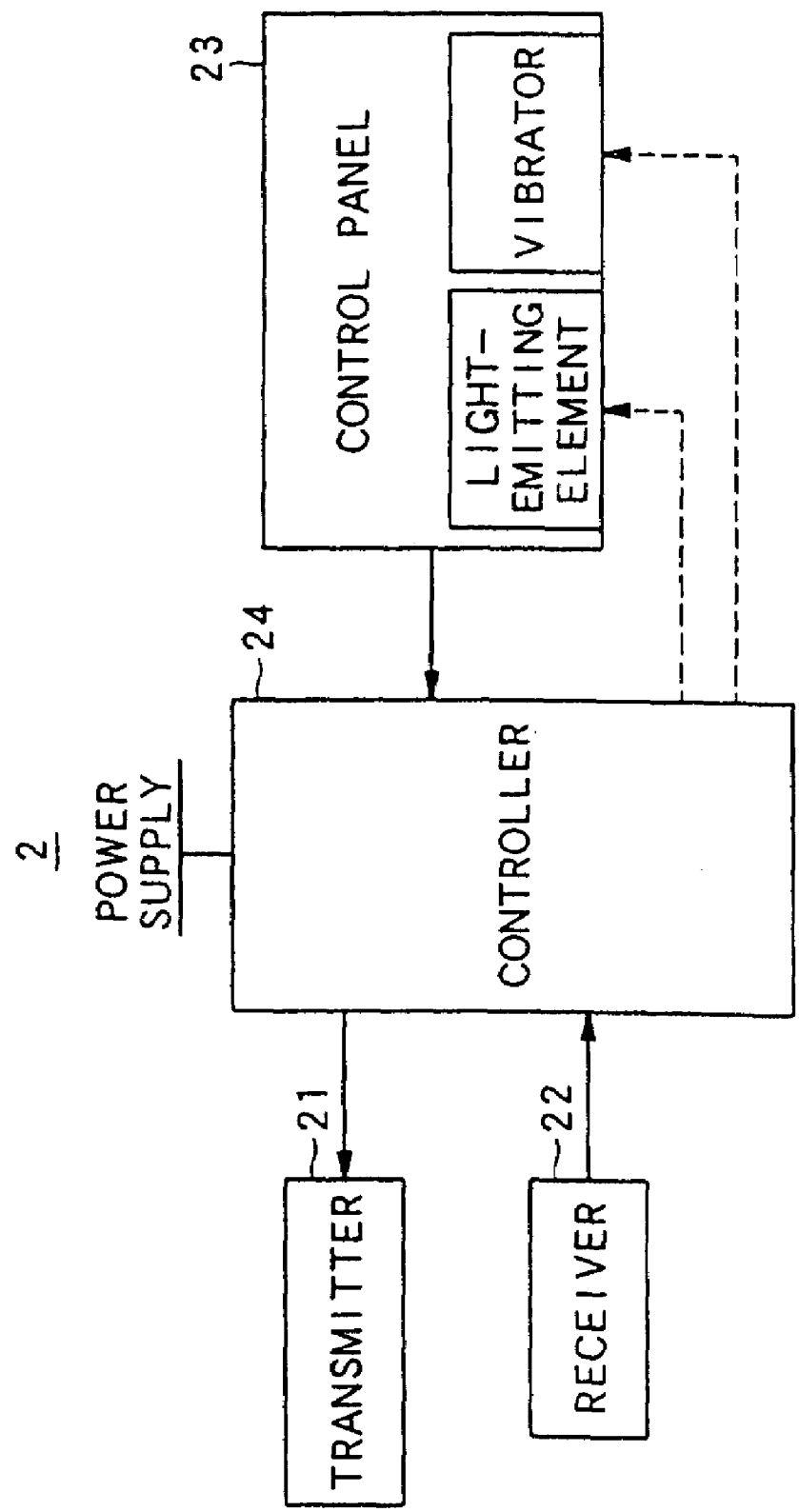
FIG. 2 is a diagram showing an exemplary schematic inner configuration of a remote control apparatus according to the first embodiment.
Figure 3:
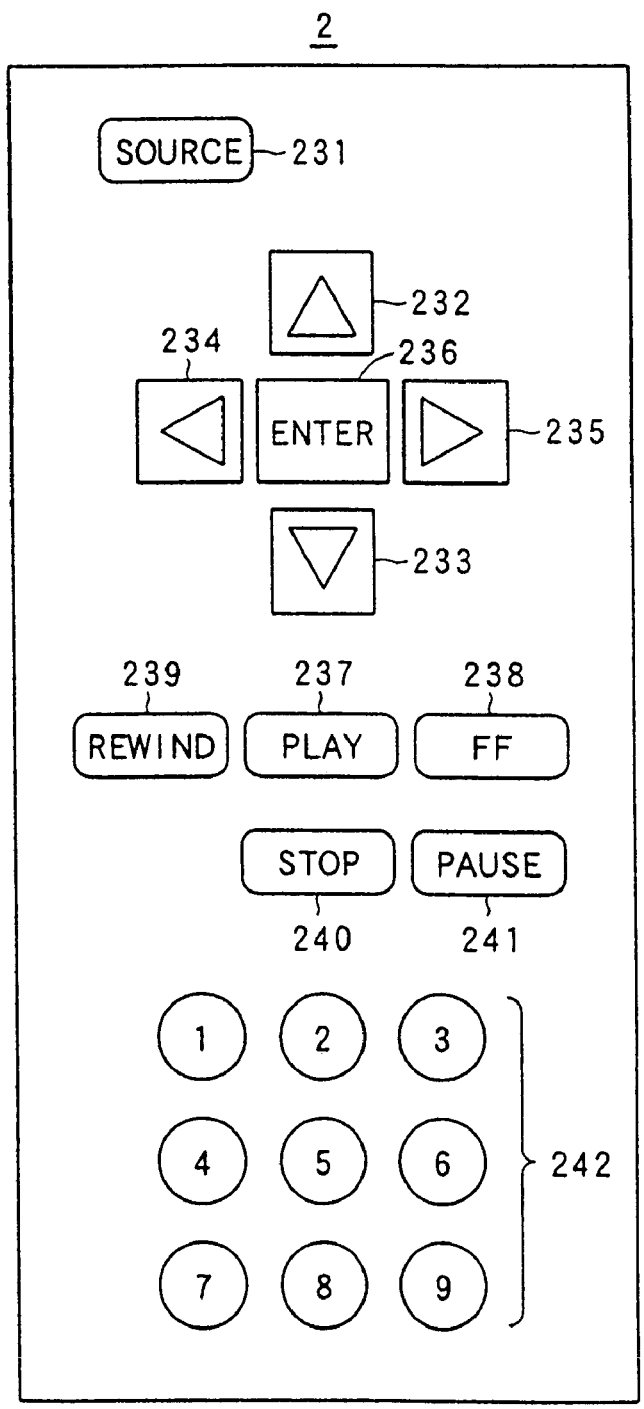
FIG. 3 is a diagram showing a plurality of operation buttons mounted on an operation panel of the remote control 2.

FIG. 1 is a diagram showing an exemplary schematic inner configuration of an audio apparatus according to the first embodiment. FIG. 2 is a diagram showing an exemplary schematic inner configuration of a remote control apparatus (hereinafter referred to as a "remote controller") according to the first embodiment. FIG. 3 is a diagram showing a plurality of operation buttons mounted on a control panel of the remote controller 2.

First, the configuration and functionality of the audio apparatus 1 will be described with reference to FIG. 1.

As shown in FIG. 1, the audio apparatus 1 is provided with a transmitter 11 which transmits signals to a remote controller 2 according to instructions from a controller 19; a receiver 12 which serves as a reception device for receiving operation signals from the remote control 2; a CD player 13 which reads content such as music from a CD and outputs it as a reproduced signal; an MD player 14 which reads content such as music from an MD and outputs it as a reproduced signal; a tuner 15 which receives broadcast waves inputted via an antenna, detects them, and outputs them as a reproduced signal; a speaker 16 which outputs the reproduced signals as sound waves; a display (e.g., liquid crystal display) 17 which displays information from the controller 19; a display processor (microcomputer for display) 18 which has a display driver, etc. and carries out processes for displaying the above information on the display 17; and the controller 19 which controls all the components described above.

The transmitter 11 as a transmission device has an infrared-emitting element and the like and transmits a signal indicated by the controller 19—for example, a signal which indicates available operation buttons described infrared pulse waves using an infrared band.

The receiver 12 has an infrared-emitting element and the like. It receives infrared pulse waves of an operation signal transmitted from the remote controller 2 and supplies the operation signal to the controller 19 after photoelectric conversion.

The CD player 13 and MD player 14 rotationally drive an CD or MD, read music from the CD or MD, and output it as a reproduced signal to the speaker 16, under drive control from the controller 19. Also, the CD player 13 and MD player 14 supplies management information (disc title, the titles and number of musical pieces, playback time, and other information) known as TOC (Table Of Content) and stored in the CD and MD, respectively, to the controller 19.

The tuner 15 detects broadcast waves (RF signal) by tuning to the frequency of a broadcasting channel indicated by the controller 19 and outputs them as a reproduced signal to the speaker 16.

The source—the CD player 13, MD player 14, or tuner 15—from which a reproduced signal should be output to the speaker 16 is determined by the controller 19.

The controller 19 has a CPU (Central Processing Unit) with arithmetic capabilities, a working RAM, a ROM, a nonvolatile memory, etc. The controller 19 switches among the CD player 13, MD player 14, and tuner 15 to output reproduced signals based on an operation signal received by the receiver 12. Specifically, if an operation signal instructing playback is received by the remote controller 2, the controller 19 drives and controls the CD player 13 to make it output a reproduced signal.

Based on the operation signal, the controller 19 displays the currently selected source (broadcasting channel in the case of the tuner) and its operational state (e.g., Playing CD) as well as TOC information supplied from the CD player 13 or MD player 14 on the display 17 via the display processor 18. This allows the user to see what source is currently selected, what is its operational state, and if a CD or MD is selected, what musical piece is being played back.

The controller 19, which functions as a selection device according to the present invention, selects available operation buttons on the remote controller 2 and outputs a signal indicating them to the transmitter 11. For example, when an operation signal instructing playback (described later) is received, the controller 19 selects operation buttons which are needed to be operated during CD playback, such as FF (Fast Forward), Rewind, Stop, and Pause buttons (described later), as available operation buttons based on the operation signal. If CD is selected but stopped (e.g., when the audio apparatus is just powered on), the controller 19 selects Left and Right buttons (described later) as available operation buttons and outputs a signal indicating them to the transmitter 11, even in the absence of an operation signal from the remote controller 2, so that musical pieces recorded on the CD can be selected.

Next, configuration and functionality of the remote controller 2 will be described with reference to FIG. 2.

As shown in FIG. 2, the remote controller 2 is provided with a transmitter 21 which serves as a transmission device for transmitting operation signals to the audio apparatus 1, a receiver 22 which serves as a reception device for receiving a signal indicating available operation buttons from the audio apparatus 1, a control panel 23 equipped with a plurality of operation buttons for remotely operating the audio apparatus 1, and a controller 24 which controls all the components described above.

The transmitter 21 has an infrared-emitting element. When any operation button on the control panel 23 is pressed, the transmitter 21 transmits an operation signal which corresponds to the operation button as infrared pulse waves using an infrared band at the instruction of the controller 24. For example, if a music selection button is pressed, a corresponding operation signal is transmitted as infrared pulse waves.

The receiver 22 has an infrared-emitting element and the like. It receives infrared pulse waves of a signal indicating available operation buttons transmitted from the audio apparatus 1 and supplies the controller 24 with a signal indicating the available operation buttons after photoelectric conversion.

As shown in FIG. 3, the control panel 23 contains the following operation buttons: a Source button 231 for transmitting an operation signal which gives an instruction to start source switching, Up button 232 and Down button 233 for transmitting an operation signal which gives an instruction to select a source, Left button 234 and Right button 235 for transmitting an operation signal which gives an instruction to select a musical piece recorded on a CD or MD, Enter button 236 for transmitting an operation signal which gives an instruction to decide on the source or musical piece selected with buttons 232 to 235 above, Play button 237 for transmitting an operation signal which gives an instruction to play back the musical piece selected and decided on, FF (Fast Forward) button 238 for transmitting an operation signal which gives a fast forward instruction for the music being played back, Rewind button 239 for transmitting an operation signal which gives a rewind instruction for the music being played back, Stop button 240 for transmitting an operation signal which gives an instruction to stop the music being played back, Pause button 241 for transmitting an operation signal which gives an instruction to pause the music being played back, and channel selector buttons 242 for transmitting an operation signal which gives an instruction to select and decide on a broadcasting channel.

All the operation buttons are provided with illumination and vibration capabilities. More specifically, each operation button is equipped with a light-emitting element (e.g., light-emitting diode) at a predetermined location on the back side and is illuminated by the light-emitting element. The illumination of the light-emitting elements is controlled by the controller 24.

Also, each operation button is equipped with a small vibrator at a predetermined location on the back side and vibrates by means of the vibrator. Incidentally, to prevent the other non-vibrating operation buttons from being affected (vibrated) while one operation button is vibrating, vibration-damping rubber is mounted (known vibration proof rubber may be used) in the place where each operation button contacts the remote controller 2. The vibration of the vibration absorbing elements is controlled by the controller 24.

The controller 24 has a CPU (Central Processing Unit) with arithmetic capabilities, a working RAM, a ROM, a nonvolatile memory, etc. The controller 24 has a capability to detect a press of an operation button on the control panel 23 and outputs an operation signal corresponding to the pressed operation button to the transmitter 21. Also, the controller 24 functions as an indication device according to the present invention and indicates available operation buttons from among the plurality of operation buttons based on a signal indicating the available operation buttons and received by the receiver 22. For example, if the available operation button is the Left button 234, the controller 24 explicitly indicates that the Left button 234 is available by illuminating it with the light-emitting element attached to it.

Similarly, if the available operation button is the Left button 234, the controller 24 explicitly indicates that the Left button 234 is available by vibrating it with the vibrator attached to it.

Figure 4:
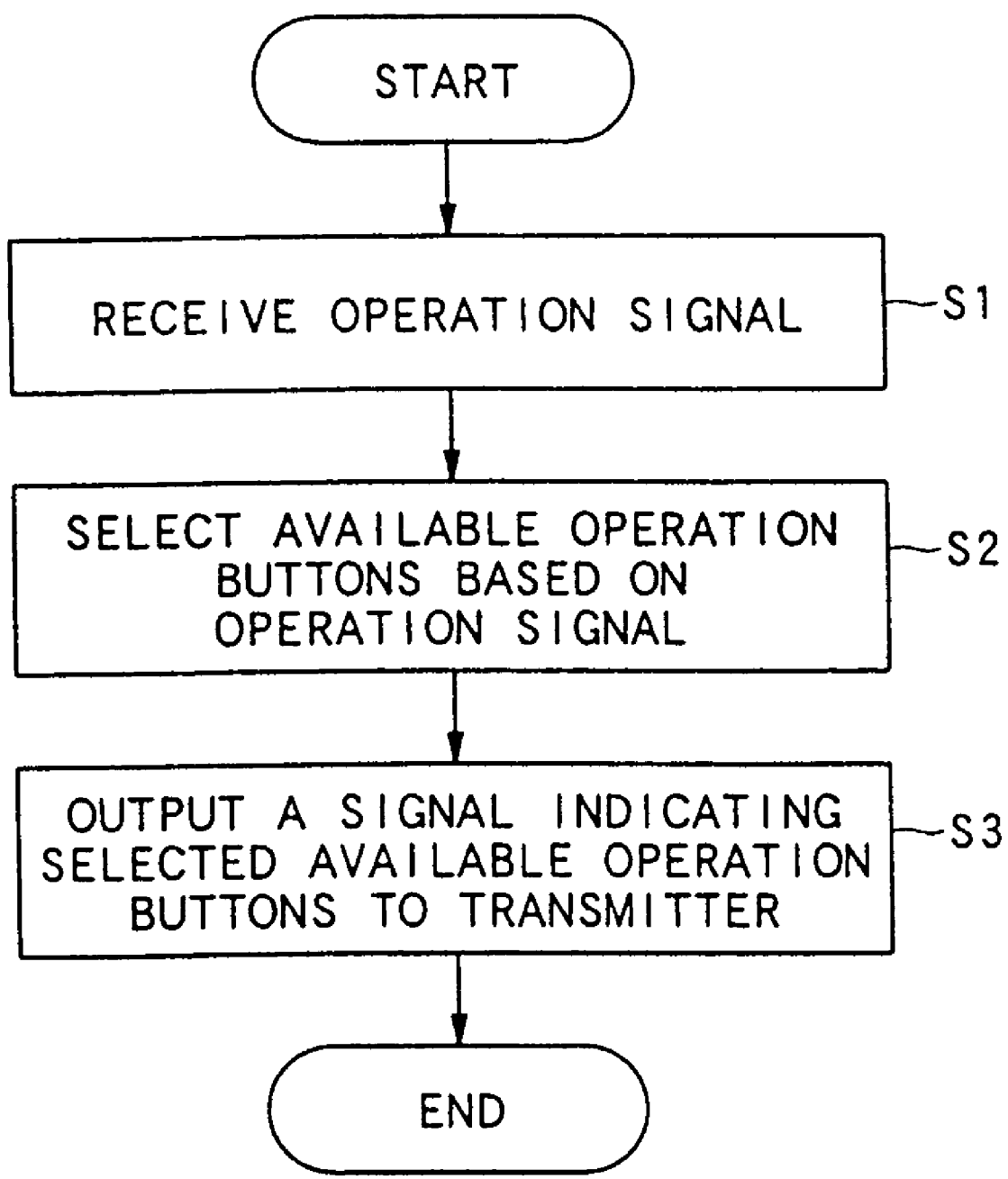
FIG. 4 is a flowchart showing processes carried out by a CPU in a controller 19 of the audio apparatus 1 to select available operation buttons.

Next, operation of the audio apparatus 1 will be described with reference to FIG. 4. FIG. 4 is a flowchart showing processes carried out by the CPU in the controller 19 of the audio apparatus 1 to select available operation buttons. These processes are carried out when a program for selecting available operation buttons is read from the ROM into the CPU which serves as a computer.

Upon receiving infrared pulse waves of an operation signal from the remote controller 2, the receiver 12 of the audio apparatus 1 supplies the operation signal to the controller 19 after photoelectric conversion.

In FIG. 4, the controller 19 receives the operation signal supplied from the receiver 12 (Step S1).

Next, the controller 19 selects available operation buttons based on the received operation signal (Step S2). For example, if an operation signal giving an instruction to start source switching is received, the controller 19 enters an operational state in which it waits for an instruction to select a source, and thus it rejects any other instruction such as an instruction to select a musical piece, instruction to play back a musical piece, instruction to select a broadcasting channel, or instruction to make a decision. Therefore, the controller 19 selects the Up button 232, Down button 233, and Enter button 236 as available operation buttons on the remote controller 2.

If the tuner is selected as a source and an instruction to make a decision is received, the controller 19 enters an operational state in which it waits for an instruction to decide on a broadcasting channel, and thus it rejects, for example, an instruction to select a musical piece and an instruction to decide on a musical piece. Therefore, the controller 19 selects the channel selector buttons 242 and Source button 231 as available operation buttons on the remote controller 2.

Then, the controller 19 outputs a signal indicating the selected available operation buttons to the transmitter 11 (Step S3). Thus, the signal indicating the available operation buttons is transmitted as infrared pulse waves to the remote controller 2.

Figure 5:
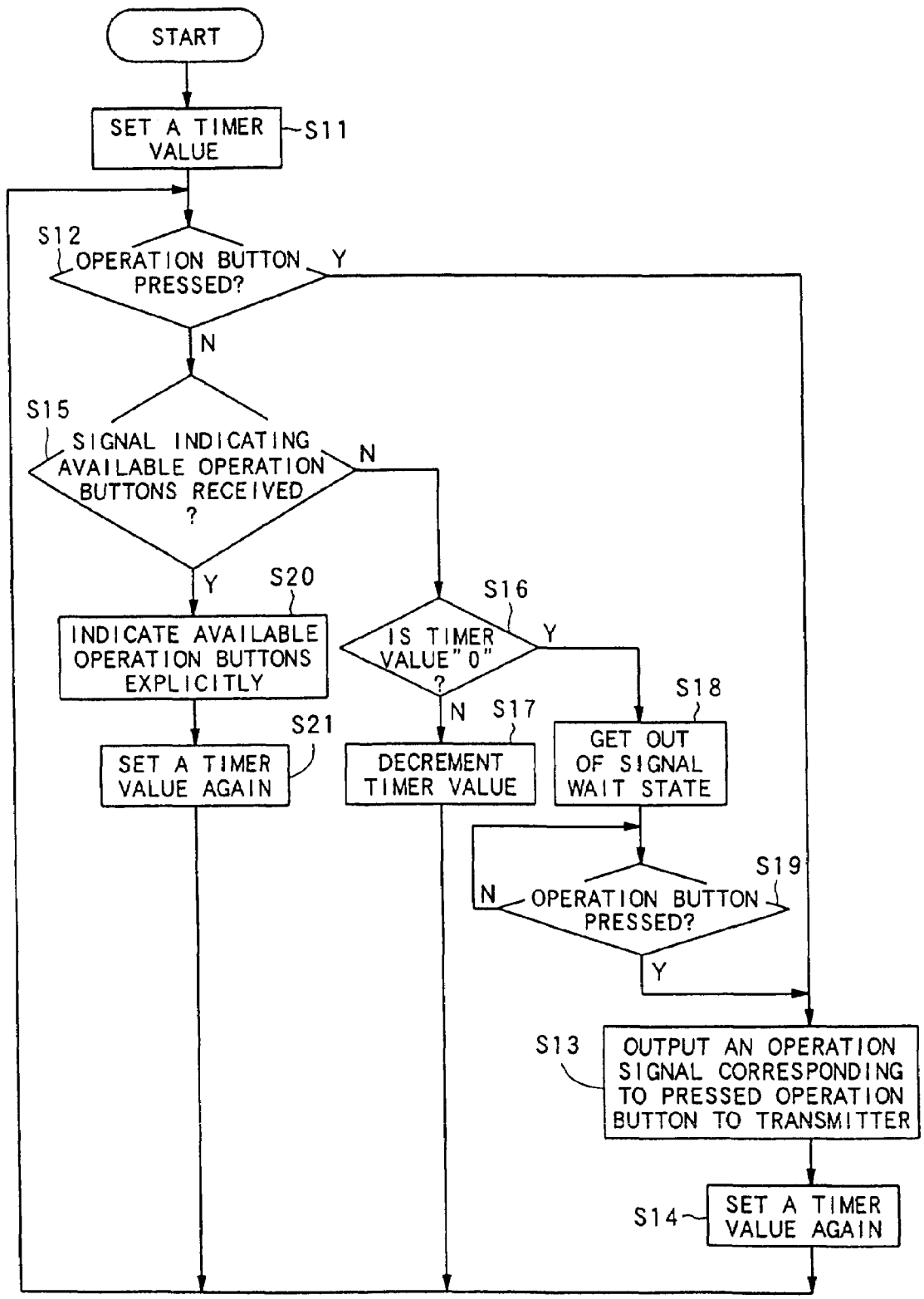
FIG. 5 is a flowchart showing processes carried out by a CPU in a controller 24 of the remote control 2 to indicate available operation buttons.

Next, operation of the remote controller 2 will be described with reference to FIG. 5. FIG. 5 is a flowchart showing processes carried out by the CPU in the controller 24 of the remote controller 2 to indicate available operation buttons. These processes are carried out when a program for indicating available operation buttons is read from the ROM into the CPU which serves as a computer.

In FIG. 5, the controller 24 sets a timer value (e.g., "10") (Step S11). The controller 24, which checks for any press of an operation button on the control panel 23 (Step S12), outputs to the transmitter 21 an operation signal corresponding to any operation button pressed (Step S13). Then, the controller 24 sets a timer value (e.g., "10") again (Step S14) and returns to Step S12. In this way, the controller 24 enters a wait state waiting for reception of a signal which indicates available operation buttons from the audio apparatus 1 (herein after referred to as the "signal wait state"). Incidentally, the operation signal outputted to the transmitter 21 is transmitted as infrared pulse waves to the audio apparatus 1.

If no press of an operation button is detected in Step S12, the controller 24 goes to Step S15, Where it judges whether a signal indicating available operation buttons is received by the receiver 22. If no signal indicating available operation buttons is received, the controller 24 judges whether the timer value is "0" (which means a timeout) (Step S16) If the timer value is not "0," the controller 24 decrements it by "1" (Step S17) and returns to Step S12. In this way, each time Step S17 is executed, the timer value is decremented by "1."

When the timer value reaches "0" in Step S16, the controller 24 gets out of the signal wait state (Step S18). Specifically, when a predetermined time elapses after the operation button is pressed, i.e., when the time required for the timer value to reach "0" elapses in this case, available operation buttons are not indicated explicitly any more in Step S20 (described later) even if a signal indicating the available operation buttons is received. However, if another button is pressed (Step S19), the controller 24 sets a timer value again in Step S14 after going through Step S13.

If a signal indicating available operation buttons is received in Step S15, the controller 24 explicitly indicates the available operation buttons from among a plurality of operation buttons based on the received signal (Step S20) and sets a timer value again (Step S21). For example, if the Up button 232, Down button 233, and Enter button 236 are the available operation buttons, the controller 24 indicates them explicitly by illuminating and vibrating them. Alternatively, it is possible to use either illumination or vibration.

Incidentally, if all the operation buttons on the remote controller 2 become unavailable, a restoration can be effected by refreshing the communication between the audio apparatus 1 and remote controller 2.

Next, concrete exchange of signals between the audio apparatus 1 and remote controller 2 will be described with reference to FIGS. 6 and 7. FIG. 6 is a sequence diagram showing a concrete example of signal exchange between the audio apparatus 1 and remote controller 2. FIGS. 7A to 7C are a diagram showing what operation buttons are designated on the remote controller 2 in each operational state of the audio apparatus 1. In FIGS. 7A to 7C, the shaded operation buttons are those indicated explicitly (illuminated and vibrated) by the controller 24.

Referring to FIG. 6, when the Source button 231 is pressed on the remote controller 2, the remote controller 2 sends the audio apparatus 1 an operation signal giving an instruction to start source switching (1). Consequently, the audio apparatus 1 enters an operational state in which it waits for an instruction to select a source. Therefore, the Up button 232, Down button 233, and Enter button 236 are selected on the audio apparatus 1. Then, the audio apparatus 1 sends the remote controller 2 a signal indicating the selected available operation buttons (Up button 232, Down button 233, and Enter button 236) (2). In this way, the Up button 232, Down button 233, and Enter button 236 are indicated explicitly on the remote controller 2 as shown in FIG. 7A.

If the Up button 232 is pressed and CD is selected and the Enter button 236 is pressed on the remote controller 2, the remote controller 2 sends the audio apparatus 1 a signal giving an instruction to decide on a source (CD) (3). Consequently, the audio apparatus 1 enters an operational state in which it waits for an instruction to select a musical piece recorded on the CD. Therefore, the Right button 235 and Enter button 236 for selecting and deciding on a musical piece are selected on the audio apparatus 1. Then, the audio apparatus 1 sends the remote controller 2 a signal indicating the selected available operation buttons (Left button 234, Right button 235, and Enter button 236) (4). In this way, the Left button 234, Right button 235, and Enter button 236 are indicated explicitly on the remote controller 2 as shown in FIG. 7B.

If, for example, the Right button 235 is pressed and a musical piece is selected and the Enter button 236 is pressed on the remote controller 2, the remote controller 2 sends the audio apparatus 1 an operation signal giving an instruction to decide on a musical piece (5). Consequently, the audio apparatus 1 enters an operational state in which it waits for an instruction to play back the musical piece as well as an operational state in which it accepts source selection/switching. Therefore, the Play button 237 and Source button 231 are selected on the audio apparatus 1. Then, the audio apparatus 1 sends the remote controller 2 a signal indicating the selected available operation buttons (Play button 237 and Source button 231) (6). In this way, the Play button 237 and Source button 231 are indicated explicitly on the remote controller 2 as shown in FIG. 7C.

As described above, according to the first embodiment, since available operation buttons are illuminated and vibrated from among a plurality of operation buttons provided on the control panel 23 of the remote controller 2, the user can understand quickly and precisely what button to press next after pressing a first button. Thus, it is possible to achieve simpler operability. In particular, vibrating available operation buttons can improve intuitive understanding (information can be conveyed quickly) and effectively supplement other sensory organs. It can also compensate for decreased sensory function of elderly people or weak-sighted people.

Furthermore, when the audio apparatus 1 is mounted on an automobile, it can reduce reliance on sight in operating it under special conditions during driving, and thus can improve safety.

Incidentally, although the first embodiment is configured mainly such that available operation buttons are selected on the audio apparatus 1 based on an operation signal from the remote controller 2, the present invention is not limited to this. It is also possible to configure the present invention so as to select available operation buttons based on the current operational state of the audio apparatus 1 even in the absence of an operation signal from the remote controller 2 and send the remote controller 2 a signal indicating the selected available operation buttons.

Second Embodiment

A second embodiment concerns a case in which signals are exchanged between an audio apparatus and a portable communications terminal according to the present invention.

Figure 8:
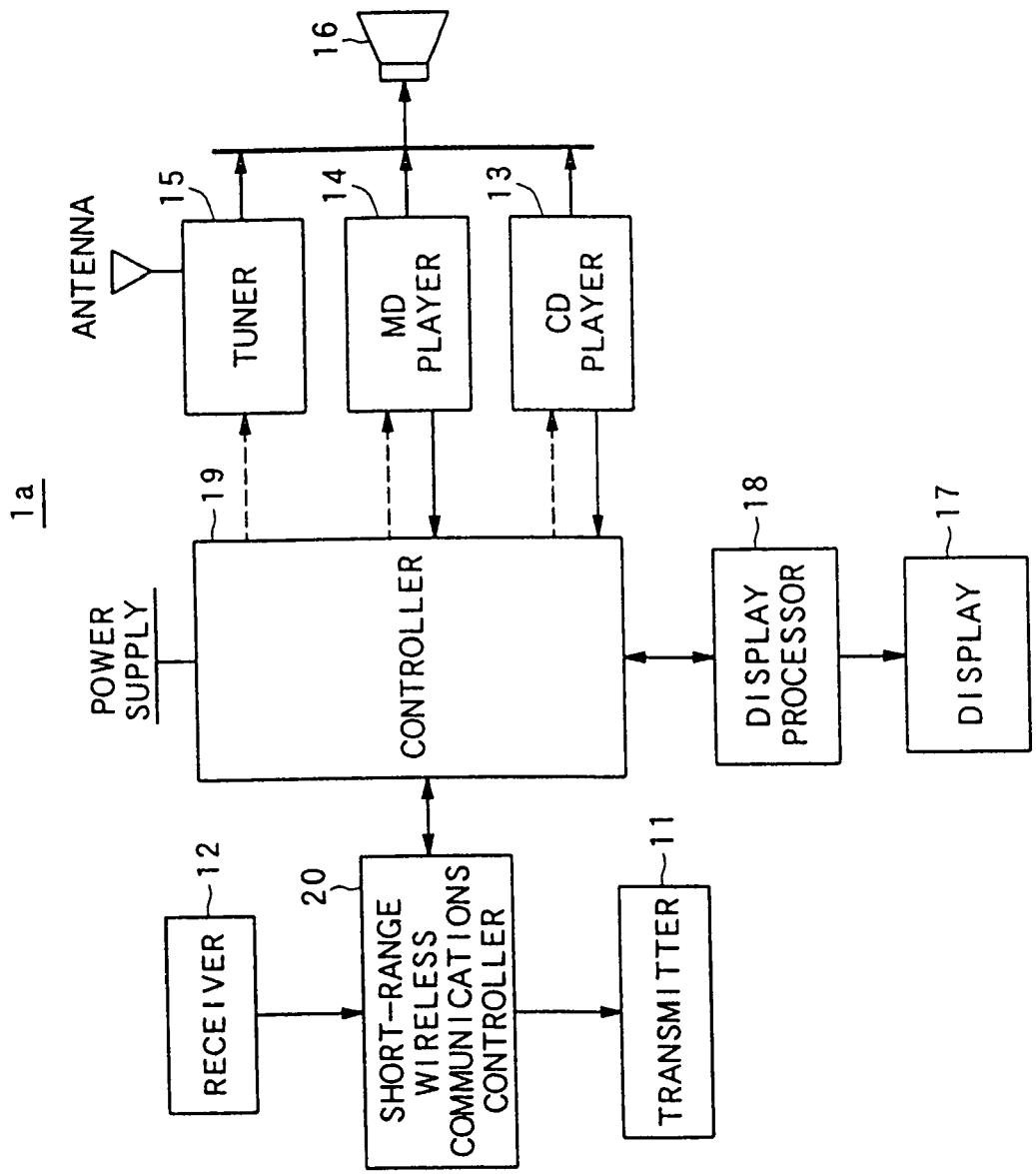
FIG. 8 is a diagram showing an exemplary schematic inner configuration of an audio apparatus according to a second embodiment.

FIG. 8 is a diagram showing an exemplary schematic inner configuration of an audio apparatus according to the second embodiment. Of the audio apparatus 1a shown in FIG. 8, components which serve the same functions as corresponding components of the audio apparatus 1 in FIG. 1 are denoted by the same reference numerals as FIG. 1 and description of their functions and the like will be omitted.

The audio apparatus 1a shown in FIG. 8 differs from the audio apparatus 1 shown in FIG. 1 in that it has a short-range wireless communications controller 20. The short-range wireless communications controller 20 is used for data (signal) communications with portable communications terminals and has short-range wireless communications capabilities which are based, for example, on Bluetooth (Japanese registered trademark), a short-range wireless communications technology standard. The Bluetooth (Japanese registered trademark) communications technology employs a master-slave technology in which apparatuses are classified into either a master apparatus which determines a frequency hopping pattern according to specific processes or a slave apparatus which is located at the remote end and controlled by the master apparatus.

Assume, for example, that the audio apparatus 1a is a master apparatus. If the master apparatus recognizes a portable communications terminal, which is a slave apparatus, within a radius of 10 meters, it carries out an authentication process which involves exchanging and verifying an ID number unique to each apparatus with the slave apparatus and generating a link key (encryption key) between the master and slave apparatuses using random numbers. After the authentication process, a connection is established between the master and slave apparatuses, enabling signal communications. Once an authentication process is carried out between master and slave apparatuses, subsequent connections between the master and slave apparatuses are established automatically, based on the link key, enabling signal communications.

Figure 9:
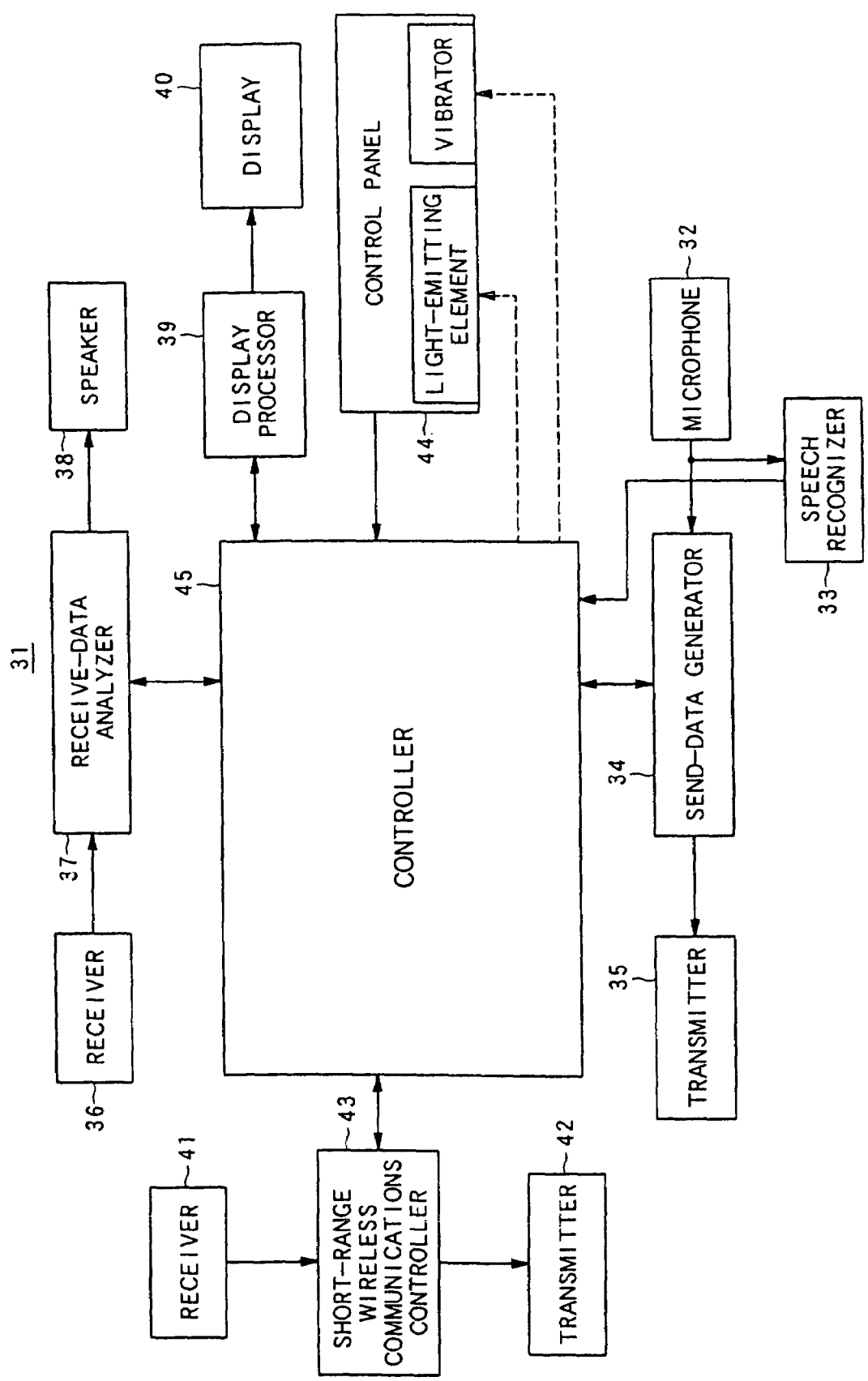
FIG. 9 is a diagram showing an exemplary schematic inner configuration of a portable telephone which serves as a portable communications terminal according to the second embodiment.
Figure 10:
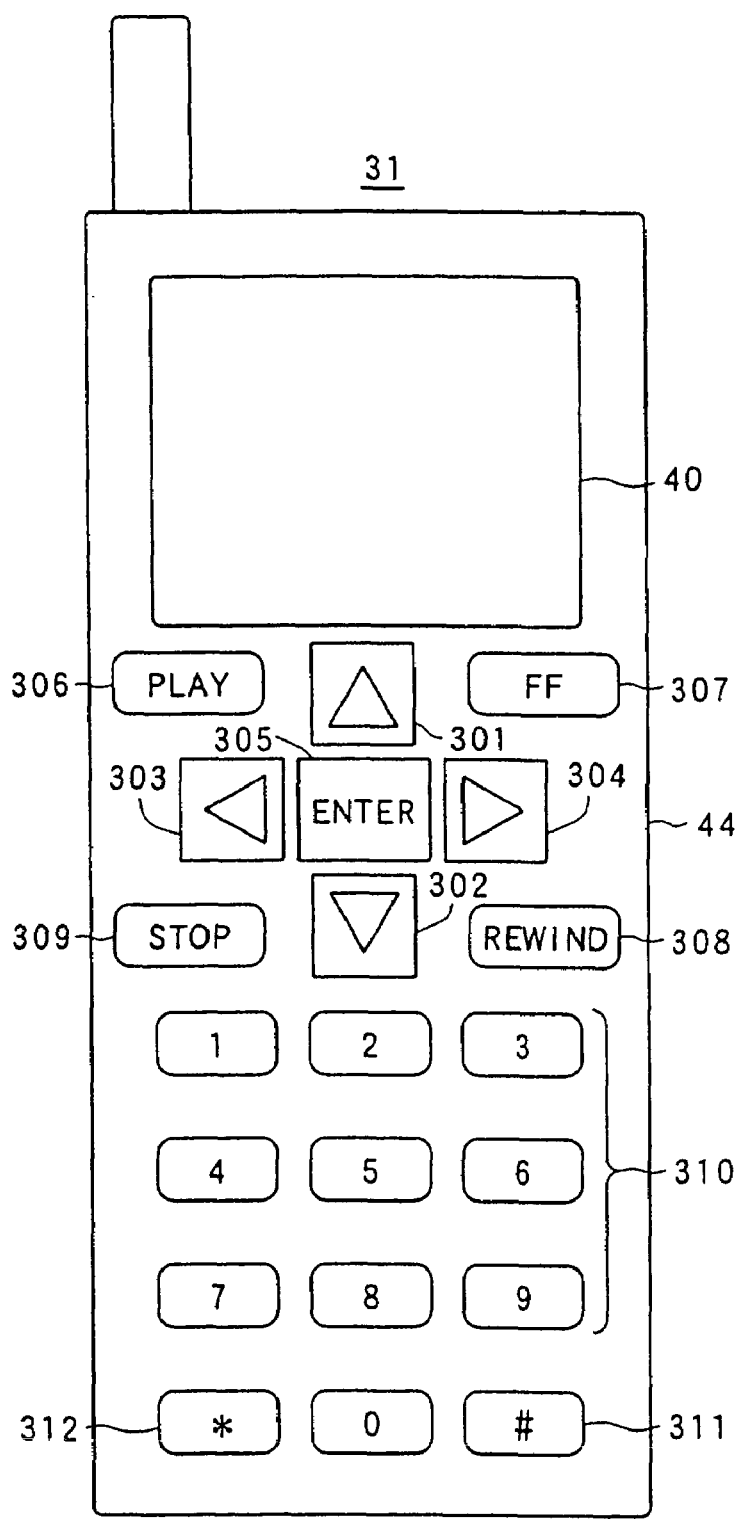
FIG. 10 is a diagram showing a plurality of operation buttons mounted on a control panel of the portable telephone 31.

FIG. 9 is a diagram showing an exemplary schematic inner configuration of a portable telephone which serves as a portable communications terminal according to the second embodiment of the present invention. FIG. 10 is a diagram showing a plurality of operation buttons mounted on a control panel of the portable telephone 31.

As shown in FIG. 9, the portable telephone 31 is provided with a microphone 32 for entering speech such as user's voice; a speech recognizer 33 which recognizes the speech entered through the microphone 32; a send-data generator 34 which generates speech data to be transmitted based on the speech recognized by the speech recognizer 33; a transmitter 35 which transmits the speech data generated by the send-data generator 34 to a wireless basestation via an antenna; a receiver 36 which receives various information (data) including the speech data from the wireless basestation; a receive-data analyzer 37 which analyzes the type of various information (data) received by the receiver 36 and outputs the speech data to a speaker 38, and the other data to a controller 45; a display (e.g., liquid crystal display) 40 which displays information from the controller 45; a display processor 39 which has a display driver and carries out processes for displaying the above information on the display 40; a transmitter 41 which serves as a transmission device for transmitting operation signals to the audio apparatus 1a; a receiver 42 which serves as a reception device for receiving operation signals indicating available operation buttons from the audio apparatus 1a; a short-range wireless communications controller 43 which controls short-range wireless signal communications by controlling the transmitter 41 and receiver 42; a control panel 44 which contains a plurality of operation buttons for use to enter a telephone number and the like and remotely control the audio apparatus 1a; and the controller 45 which controls all the components described above.

As with the short-range wireless communications controller 20 on the audio apparatus 1a, the short-range wireless communications controller 43 has short-range wireless communications capabilities which are based on Bluetooth (registered trademark), a short-range wireless communications technology standard. This allows the portable telephone 31 to exchange signals with the audio apparatus 1a as described above.

The control panel 44 contains a plurality of operation buttons as shown in FIG. 10. When the portable telephone 31 establishes communication with the audio apparatus 1a, an Up button 301, Down button 302, Left button 303, Right button 304, and Enter button 305 shown in FIG. 10 serve the same functions, respectively, as the Up button 232, Down button 233, Left button 234, Right button 235, and Enter button 236 on the remote controller 2 shown in FIG. 3; a Play button 306, FF (Fast Forward) button 307, Rewind button 308, and Stop button 309 shown in FIG. 10 serve the same functions, respectively, as the Play button 237, FF (Fast Forward) button 238, Rewind button 239, and Stop button 240 on the remote controller 2 shown in FIG. 3; a [#] button 311 shown in FIG. 10 serves the same function as the Source button 231 on the remote controller 2 shown in FIG. 3; number buttons 310 shown in FIG. 10 serve the same functions as the channel selector buttons 242; and an [*] button 312 shown in FIG. 10 serves the same function as the Pause button 241 on the remote controller 2 shown in FIG. 3.

Each of the operation buttons on the portable telephone 31 has illumination and vibration capabilities as is the case with the operation buttons on the remote controller 2. The illumination and vibration capabilities are similar to those of the remote controller 2 described in the first embodiment and thus detailed description thereof will be omitted.

The controller 45 has a CPU (Central Processing Unit) with arithmetic capabilities, a working RAM, a ROM, a nonvolatile memory, etc. When the portable telephone 31 establishes communication with the audio apparatus 1a as described above, the controller 45 controls the operation buttons on the control panel 44 to operate the audio apparatus 1a. The controller 45 has a capability to detect a press of an operation button on the control panel 44 and outputs an operation signal corresponding to the pressed operation button to the transmitter 41 via the short-range wireless communications controller 43. Also, the controller 45 functions as an indication device according to the present invention and has a capability to indicate available operation buttons from among the plurality of operation buttons based on a signal indicating the available operation buttons, received by the receiver 42, and inputted via the short-range wireless communications controller 43. The capability to indicate available operation buttons is similar to that of the remote controller 2 described in the first embodiment and thus detailed description thereof will be omitted.

With the above configuration, the audio apparatus 1a carries out processes shown in FIG. 4 as is the case with the first embodiment, and the portable telephone 31 carries out processes shown in FIG. 5. This allows signals to be exchanged between the audio apparatus 1a and portable telephone 31 according to procedures shown in FIG. 6, as is the case with the first embodiment.

As described above, according to the second embodiment, since available operation buttons are illuminated and vibrated from among a plurality of operation buttons on the control panel 44 of the portable telephone 31, the user can understand quickly and precisely what button to press next after pressing a first button. Thus, it is possible to achieve simpler operability. In particular, vibrating available operation buttons can improve intuitive understanding (information can be conveyed quickly) and effectively supplement other sensory organs. It can also compensate for decreased sensory function of elderly people or weak-sighted people.

Furthermore, when the audio apparatus 1a is mounted on an automobile, it can reduce reliance on sight in operating it under special conditions during driving, and thus can improve safety.

Incidentally, although the second embodiment is configured mainly such that available operation buttons are selected on the audio apparatus 1a based on an operation signal from the portable telephone 31, the present invention is not limited to this. It is also possible to configure the present invention so as to select available operation buttons based on the current operational state of the audio apparatus 1a even in the absence of an operation signal from the portable telephone 31 and send the portable telephone 31 a signal indicating the selected available operation buttons.

Third Embodiment

A third embodiment concerns an audio apparatus serving as an electronic apparatus equipped with an operation panel containing a plurality of operation buttons. In other words, according to this embodiment, the remote controller 2 described above is integrated as the operation panel into the audio apparatus.

Figure 11:
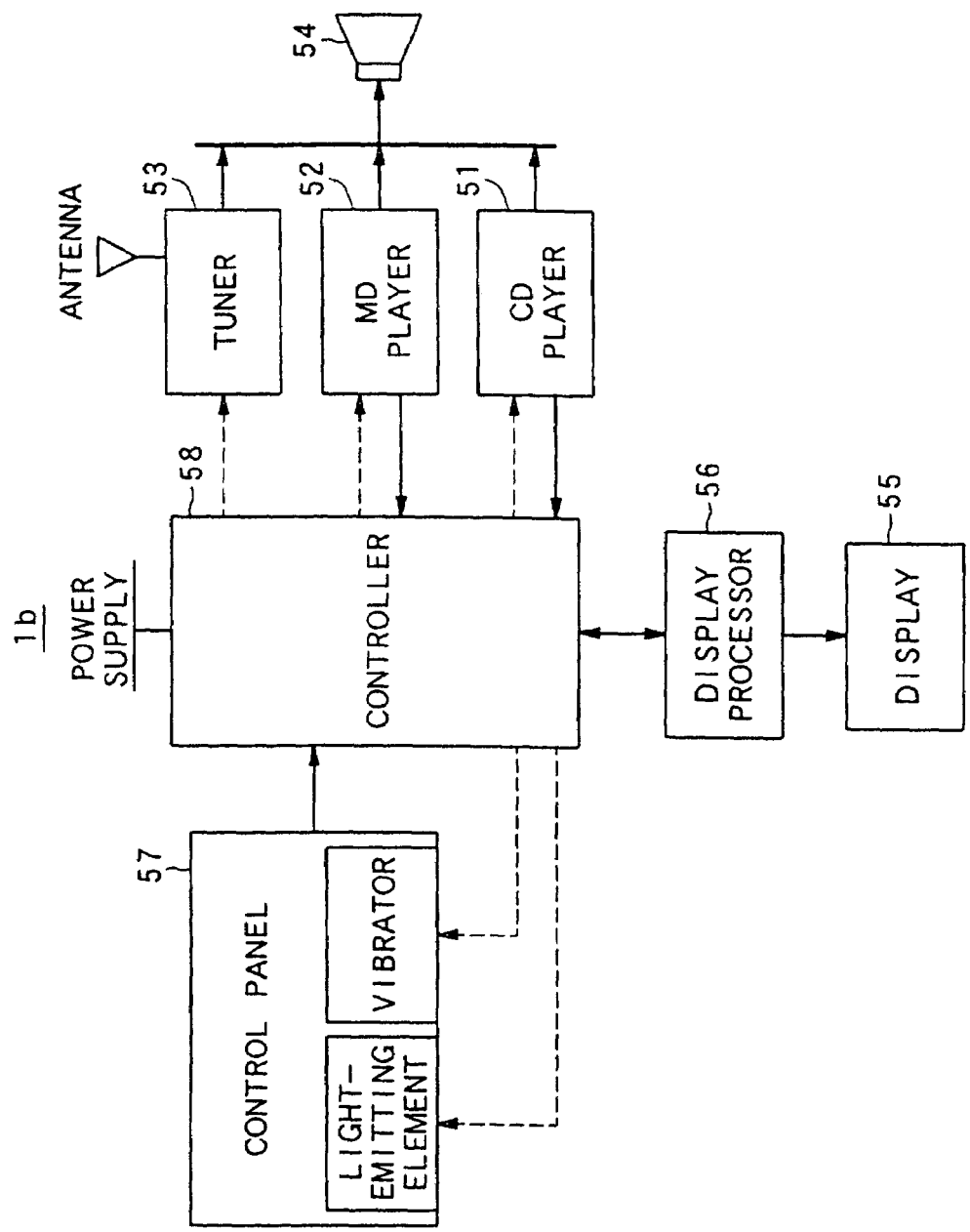
FIG. 11 is a diagram showing an exemplary schematic inner configuration of an audio apparatus according to a third embodiment.
Figure 12:
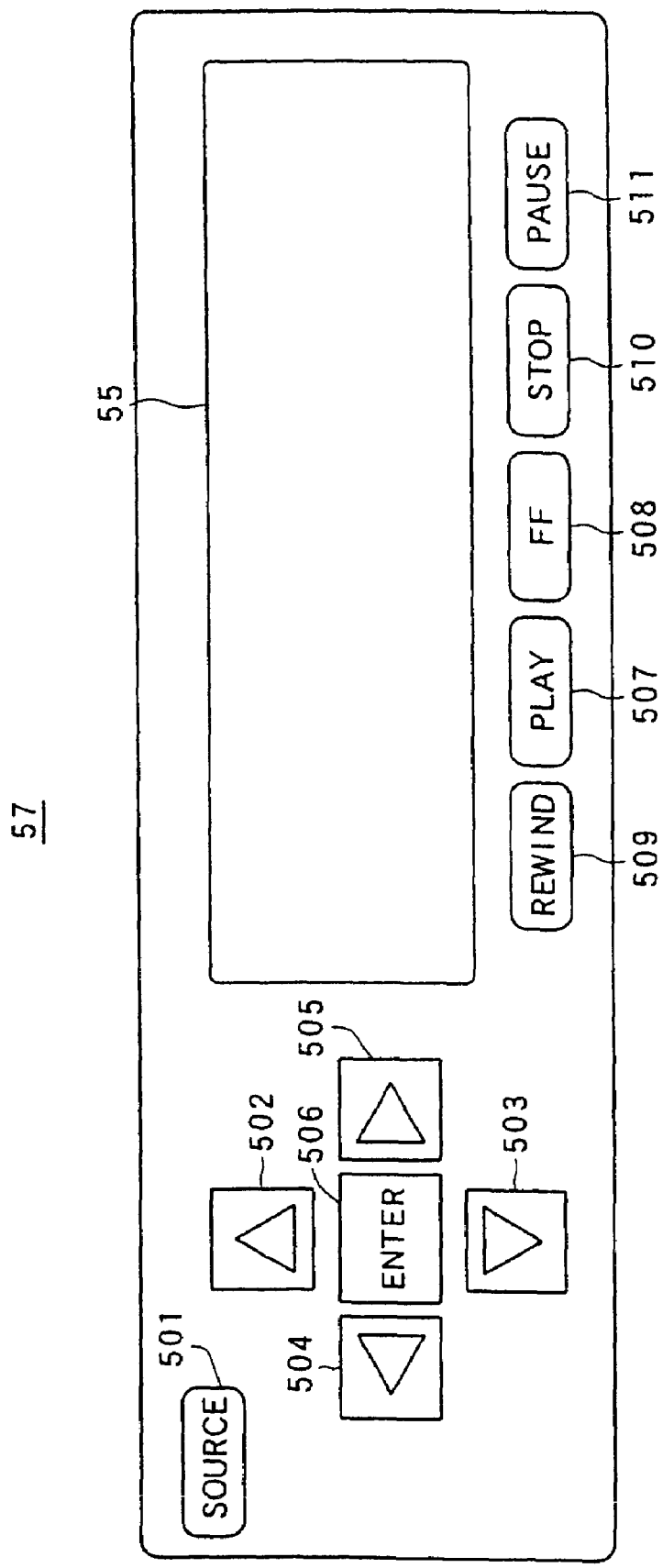
FIG. 12 is a diagram showing a plurality of operation buttons mounted on an operation panel.
Figure 13:
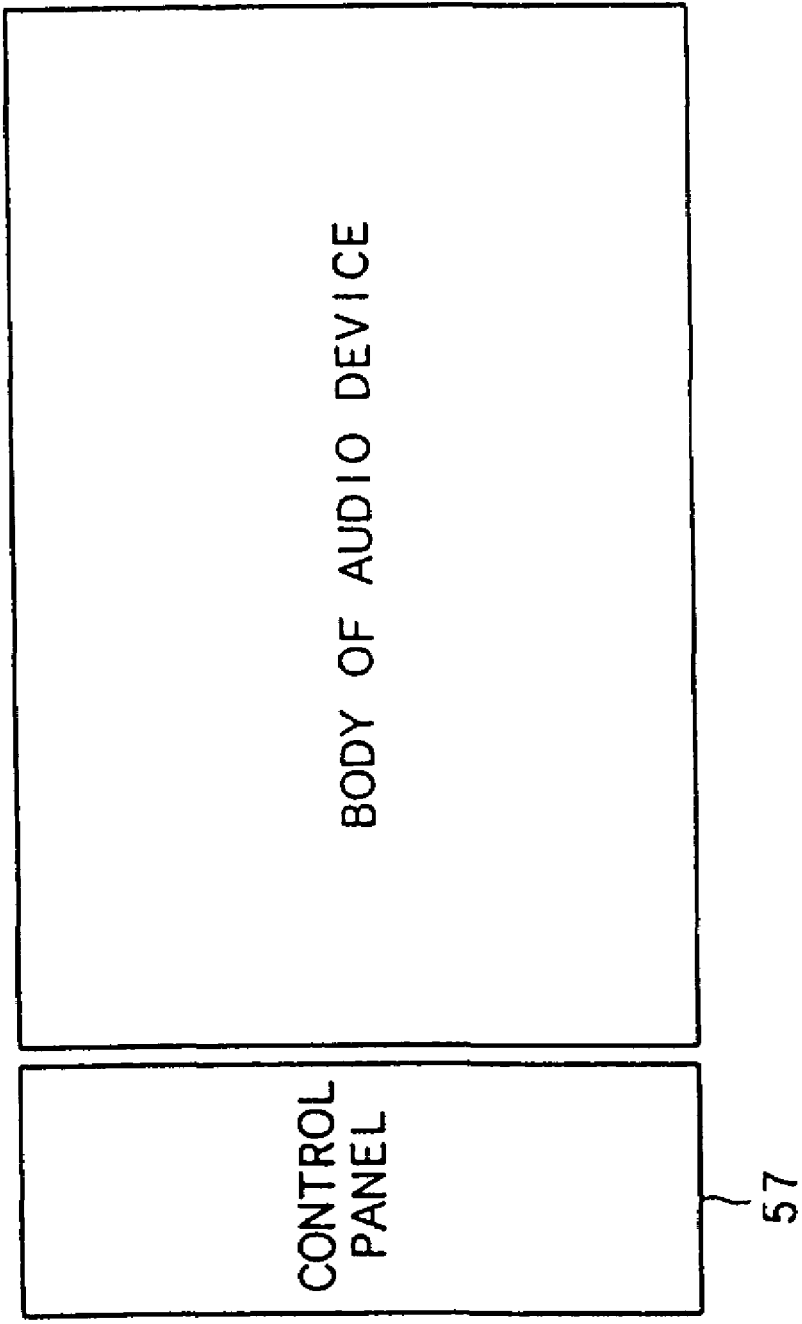
FIG. 13 is a side view of the audio apparatus 1b equipped with the operation panel 57.

FIG. 11 is a diagram showing an exemplary schematic inner configuration of an audio apparatus according to the third embodiment. FIG. 12 is a diagram showing a plurality of operation buttons mounted on the operation panel. FIG. 13 is a side view of the audio apparatus 1b equipped with the operation panel 57.

As shown in FIG. 11, the audio apparatus 1b is provided with a CD player 51 which reads content such as music from a CD and outputs it as a reproduced signal; an MD player 52 which reads content such as music from an MD and outputs it as are produced signal; a tuner 53 which receives broadcast waves inputted via an antenna, detects them, and outputs them as a reproduced signal; a speaker 54 which outputs the reproduced signals as sound waves; a display (e.g., liquid crystal display) 55 which displays information from a controller 58; a display processor (microcomputer for display) 56 which has a display driver, etc. and carries out processes for displaying the above information on the display 55; the operation panel 57 containing a plurality of operation buttons for use to operate the audio apparatus 1b; and the controller 58 which controls all the components described above.

The CD player 51, MD player 52, and tuner 53 serve the same functions, respectively, as the CD player 13, MD player 14, and tuner 15 according to the first embodiment.

According to the third embodiment, the operation panel 57 containing a plurality of operation buttons for manipulation is connected by wire to the controller 58 unlike in the first and second embodiments. However, the operation panel 57 may be attachable/detachable to/from the body of the audio apparatus. In other words, the operation panel 57 shown in FIG. 13 may be configured such that it can be removed from the body of the audio apparatus.

The operation panel 57 contains a plurality of operation buttons as shown in FIG. 12. The Source button 501, Up button 502, Down button 503, Left button 504, Right button 505, Enter button 506, Play button 507, FF (Fast Forward) button 508, Rewind button 509, Stop button 510, and Pause button 511 correspond, respectively, to the Source button 231, Up button 232, Down button 233, Left button 234, Right button 235, Enter button 236, Play button 237, FF (Fast Forward) button 238, Rewind button 239, Stop button 240, and Pause button 241 on the remote controller 2 shown in FIG. 3. Besides, the operation panel 57 has the display 55 built into it.

The controller 58 has a CPU (Central Processing Unit) with arithmetic capabilities, a working RAM, a ROM, a nonvolatile memory, etc. The controller 58 functions as a recognition device according to the present invention and recognizes any operation button pressed from among a plurality of operation buttons on the operation panel 57. It controls the above components based on results of the recognition. For example, the controller 58 switches among the CD player 51, MD player 52, and tuner 53 to output reproduced signals based on an operation signal from the operation panel 57. Thus, if an operation signal instructing playback is received by the operation panel 57, the controller 58 drives and controls the CD player 51 to make it output a reproduced signal.

Based on the operation signal, the controller 58 displays the currently selected source (broadcasting channel in the case of the tuner) and its operational state (e.g., Playing CD) as well as TOC information supplied from the CD player 51 or MD player 52 on the display 55 via the display processor 56. This embodiment is similar to the first and second embodiments in this respect.

Also, the controller 58 functions as a selection device and selects available operation buttons from among a plurality of operation buttons on the operation panel 57 based on the recognition results described above. Selection procedures are similar to those in the first embodiment.

Furthermore, the controller 58 functions as an indication device and indicates the selected available operation buttons. Specifically, the controller 58 serves the same functions as the controller 24 on the remote controller 2 in the first embodiment, and if the available operation button is the Left button 504, for example, the controller 58 explicitly indicates that the Left button 504 is available by illuminating it with the light-emitting element attached to it.

Similarly, if the available operation button is the Left button 504, the controller 58 explicitly indicates that the Left button 504 is available by vibrating it with the vibrator attached to it.

Figure 14:
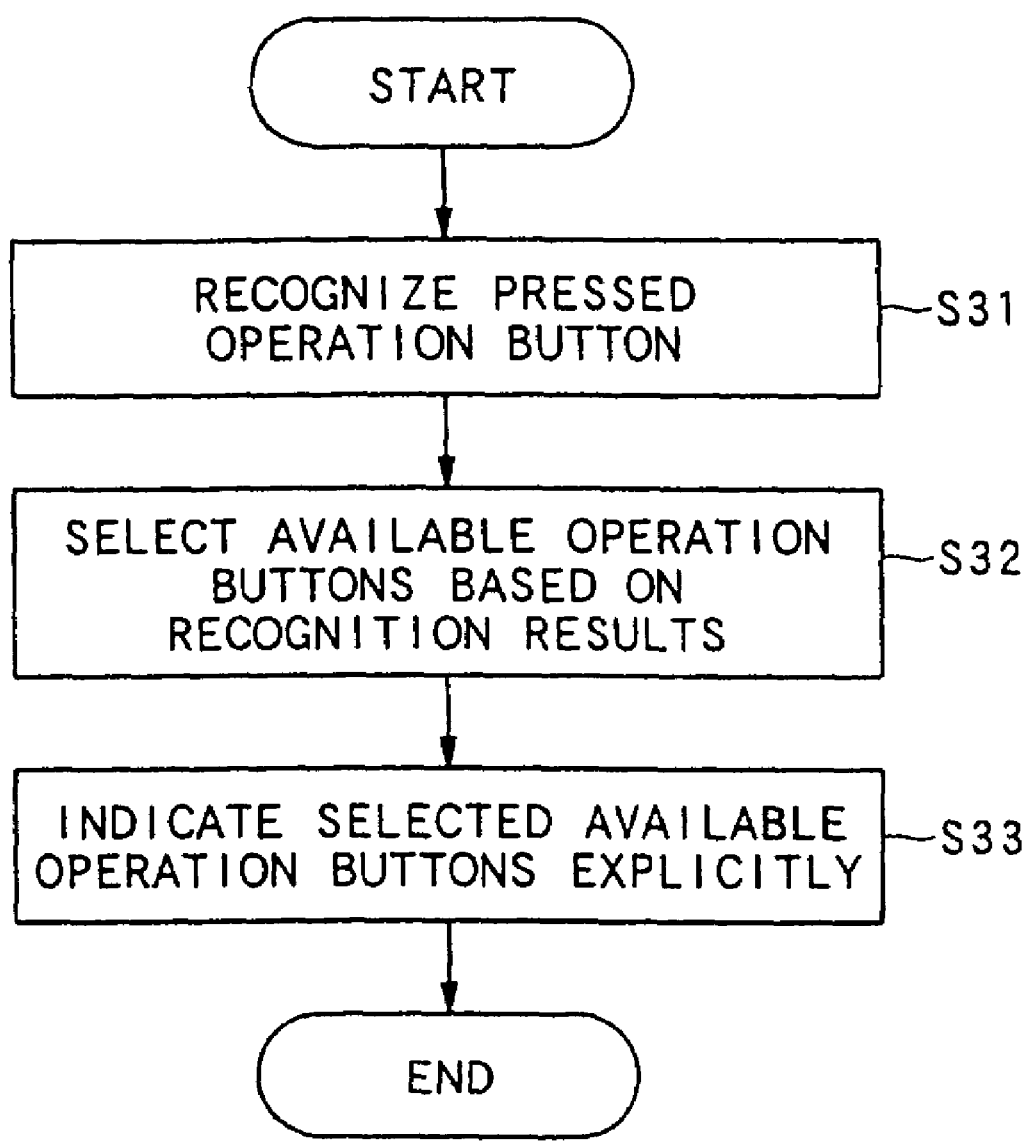
FIG. 14 is a flowchart showing processes carried out by a CPU in a controller 58 of the audio apparatus 1b to select and indicate available operation buttons according to the third embodiment.

FIG. 14 is a flowchart showing processes carried out by the CPU in the controller 58 of the audio apparatus 1b to select and indicate available operation buttons. These processes are carried out when a program for selecting and indicating available operation buttons is read from the ROM into the CPU which serves as a computer.

In FIG. 14, when any of a plurality of operation buttons is pressed on the operation panel 57 of the audio apparatus 1b, a signal corresponding to the pressed operation button is output to the controller 58, which then recognizes what operation button is pressed (Step S31).

Next, the controller 58 selects available operation buttons from among the plurality of operation buttons on the operation panel 57 based on results of the recognition (Step S32). Then, the controller 58 explicitly indicates the selected available operation buttons as described above (Step S33).

Figure 15:
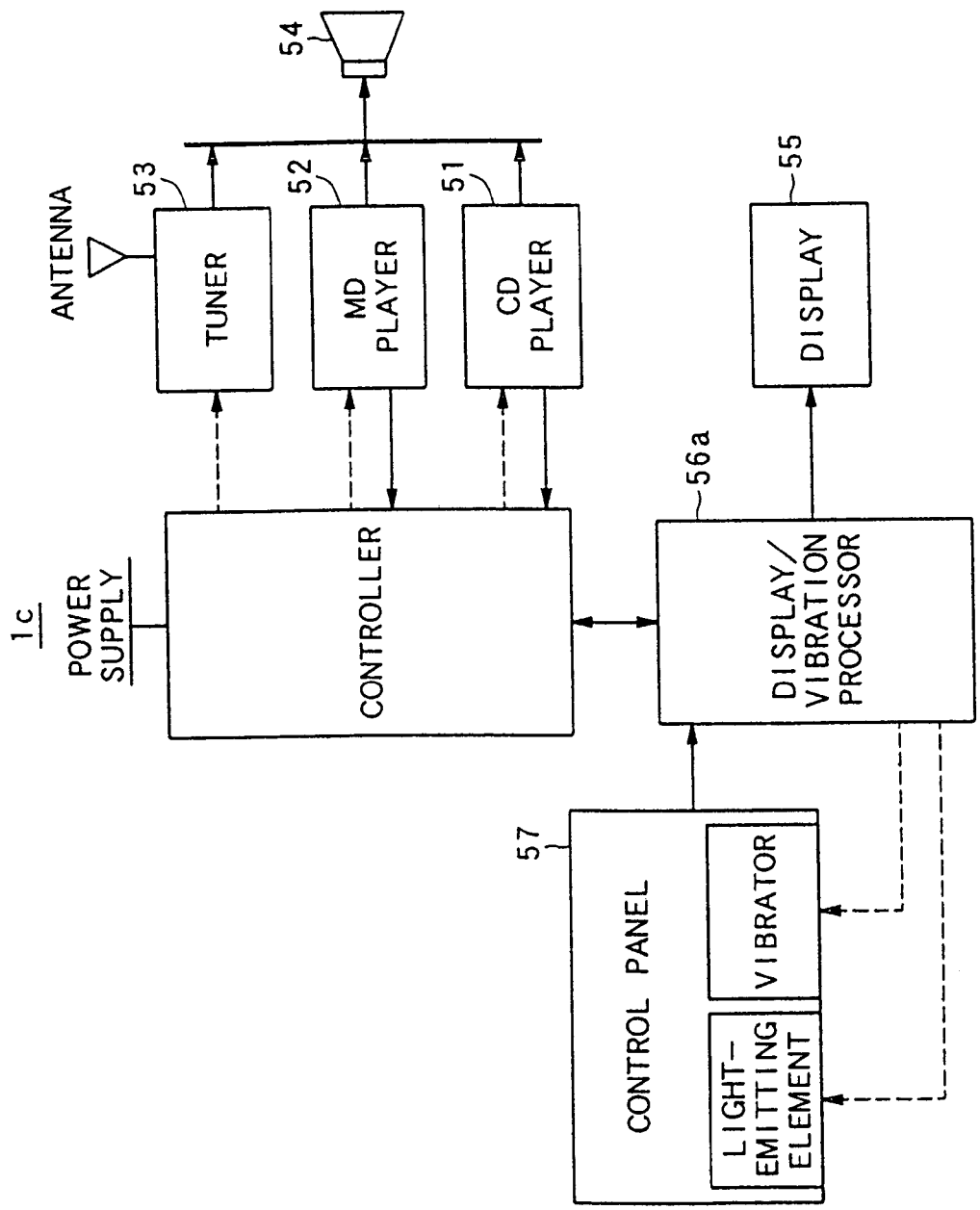
FIG. 15 is a diagram showing another exemplary schematic inner configuration of the audio apparatus according to the third embodiment.

According to the third embodiment, the processes of selecting and indicating available operation buttons in FIG. 14 are carried out by the controller 58, but in another embodiment, they may be carried out, for example, by a display/vibration processor 56a as shown in FIG. 15. In other word, the display processor 18, which carries out only display processing according to the first embodiment, may be configured to carry out the processes of selecting and indicating available operation buttons.

As described above, according to the third embodiment, since available operation buttons are illuminated and vibrated from among a plurality of operation buttons on the operation panel 57, the user can understand quickly and precisely what button to press next after pressing a first button. Thus, it is possible to achieve simpler operability. In particular, vibrating available operation buttons can improve intuitive understanding (information can be conveyed quickly) and effectively supplement other sensory organs. It can also compensate for decreased sensory function of elderly people or weak-sighted people.

Furthermore, when the audio apparatus 1b or 1c is mounted on an automobile, it can reduce reliance on sight in operating it under special conditions during driving, and thus can improve safety.

Incidentally, although the above embodiments are configured such that available operation buttons are indicated by means of illumination and vibration, the present invention is not limited to this. For example, the first embodiment may be configured such that the remote controller 2 will be equipped with a display (e.g., liquid crystal display) on which marks of available operation buttons (e.g., marks of the Up and Down buttons) will be displayed (navigation assistance capabilities) Also, the second embodiment may be configured such that marks of available operation buttons (e.g., marks of the Up and Down buttons) will be displayed on the display 40 of the portable telephone 31 (navigation assistance capabilities). Also, in the second embodiment, available operation buttons may be indicated by voice through the speaker 38.

Simpler operability can also be achieved by providing the audio apparatus 1 or 1a with navigation assistance capabilities and displaying similar marks of available operation buttons both on the display of the remote controller 2 or portable telephone 31 and on the display of the audio apparatus 1 or 1a.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2002-52781 filed on Feb. 28, 2002 including the specification, claims, drawings and summary is incorporated herein by reference in its entirety.

What is claimed is:

1. A remote control apparatus for remotely operating an electronic apparatus, comprising:
    a reception device which receives a signal indicating available operation buttons transmitted from the electronic apparatus;
    an indication device which explicitly indicates by making only available operation buttons vibrate among a plurality of operation buttons each having independent vibration capability based on the received signal which indicates available operation buttons; and
    vibration absorbing elements for preventing buttons other than the vibrating buttons from vibrating, wherein the vibration absorbing elements are respectively mounted at the locations where each operation button contacts the remote control apparatus for preventing buttons not vibrating from being vibrated while the available operation button is thus vibrating.

2. The remote control apparatus according to claim 1, wherein:
    each of the operation buttons further has an illumination capability; and
    the indication device illuminates the available operation buttons.

3. The remote control apparatus according to claim 1, wherein the remote control apparatus is a portable communications terminal.

4. The remote control apparatus according to claim 1, wherein
    the indication device includes a controller that controls vibration or vibration absorption in each of the operation buttons.

5. The remote control apparatus according to claim 4, wherein
    the remote control apparatus is a portable communications terminal.

6. A remote control apparatus for remotely operating an electronic apparatus, comprising:
    a plurality of operation buttons, each having independent vibration capability, for remotely operating the electronic apparatus;
    a transmission device which transmits an operation signal to the electronic apparatus in accordance with any operation button pressed from among the operation buttons;
    a reception device which receives a signal indicating available operation buttons transmitted from the electronic apparatus after the operation signal is transmitted to the electronic apparatus;
    an indication device which explicitly indicates by making only available operation buttons vibrate among said plurality of operation buttons based on the received signal which indicates the available operation buttons; and
    vibration absorbing elements for preventing buttons other than the vibrating buttons from vibrating, wherein the vibration absorbing elements are respectively mounted at the locations where each operation button contacts the remote control apparatus for preventing buttons not vibrating from being vibrated while the available operation button is thus vibrating.

7. The remote control apparatus according to claim 6, wherein:
    the indication device explicitly indicates the available operation buttons only when the reception device receives a signal which indicates the available operation buttons within a predetermined time after the operation button is pressed.

8. The remote control apparatus according to claim 6, wherein
    the indication device includes a controller that controls vibration or vibration absorption in each of the operation buttons.

9. The remote control apparatus according to claim 8, wherein:
    the indication device explicitly indicates the available operation buttons only when the reception device receives a signal which indicates the available operation buttons within a predetermined time after the operation button is pressed.

10. An electronic apparatus equipped with an operation panel, comprising:
    an operation panel which contains a plurality of operation buttons, each having independent vibration capability;
    a recognition device which recognizes any operation button pressed from among the operation buttons;
    a selection device which selects the available operation buttons from among the plurality of operation buttons based on results of the recognition;
    an indication device which explicitly indicates by making only the selected available operation buttons vibrate; and
    vibration absorbing elements for preventing buttons other than the vibrating buttons from vibrating, wherein the vibration absorbing elements are respectively mounted at the locations where each operation button contacts the electronic apparatus for preventing buttons not vibrating from being vibrated while the available operation button is thus vibrating.

11. The electronic apparatus according to claim 10, wherein:
    each of the operation buttons further has an illumination capability; and the indication device illuminates the available operation buttons.

12. The electronic apparatus according to claim 11, wherein:
the indication device includes a controller that controls vibration or vibration absorption in each of the operation buttons.

13. The electronic apparatus according to claim 10, wherein: the operation panel is removably mounted on the electronic apparatus.

14. The electronic apparatus according to claim 10, wherein:
the indication device includes a controller that controls vibration or vibration absorption in each of the operation buttons.

15. An available-button indicating method for explicitly indicating, to the user, operation buttons available for use to remotely operate an electronic apparatus from among a plurality of operation buttons, each having independent vibration capability and mounted on a remote control apparatus, comprising:
a step in which the electronic apparatus selects available operation buttons on the remote control apparatus;
a step in which the electronic apparatus transmits a signal indicating the selected available operation buttons to the remote control apparatus;
a step in which the remote control apparatus indicates only the available operation buttons by their vibration among said plurality of operation buttons based on the signal indicating the available operation buttons and transmitted from the electronic apparatus; and
a step of controlling to prevent buttons other than the vibrating buttons from being vibrated, wherein the step of controlling to prevent buttons other than the vibrating buttons from being vibrated is achieved via vibration absorbing elements that are respectively mounted at the locations where each operation button contacts the remote control apparatus for preventing buttons not vibrating from being vibrated while the available operation button is thus vibrating.

16. The available-button indicating method according to claim 15, wherein the remote control apparatus is a portable communications terminal.

17. An available-button indicating method for explicitly indicating, to the user, operation buttons available for use to operate an electronic apparatus from among a plurality of operation buttons, each having independent vibration capability and mounted on a remote control apparatus, comprising:
a step in which the remote control apparatus transmits an operation signal to the electronic apparatus in accordance with any operation button pressed from among said plurality of operation buttons on the remote control apparatus;
a step in which the electronic apparatus selects available operation buttons on the remote control apparatus based on the operation signal transmitted from the remote control apparatus;
a step in which the electronic apparatus transmits a signal indicating the selected available operation buttons to the remote control apparatus;
a step in which the remote control apparatus explicitly indicates the available operation buttons by their vibration among said plurality of operation buttons based on the signal indicating the available operation buttons and transmitted from the electronic apparatus; and
a step in which the remote control apparatus controls to prevent buttons other than the vibrating buttons from being vibrated, wherein the step in which the remote control apparatus controls to prevent buttons other than the vibrating buttons from being vibrated is achieved via vibration absorbing elements that are respectively mounted at the locations where each operation button contacts the remote control apparatus for preventing buttons not vibrating from being vibrated while the available operation button is thus vibrating.

* * * * *